United States Patent [19]
Schneider

[11] 3,850,812
[45] Nov. 26, 1974

[54] PLATE AND FRAME TYPE FILTERING APPARATUS

[76] Inventor: John Russel Schneider, P.O. Box 878, Belvedere, Calif. 94920

[22] Filed: Aug. 21, 1972

[21] Appl. No.: 282,070

[52] U.S. Cl. .............................................. 210/231
[51] Int. Cl. ........................................... B01d 25/12
[58] Field of Search ........................... 210/224–231, 210/498, 541, 542; 100/197, 198, 266, 230, 252, 253, 297

[56] References Cited
UNITED STATES PATENTS

| | | | |
|---|---|---|---|
| 1,470,463 | 10/1923 | Manning | 210/541 |
| 2,285,894 | 6/1942 | Brooks | 210/541 |
| 2,796,993 | 6/1957 | Imershein | 210/231 |
| 3,074,559 | 1/1963 | Saving | 210/231 X |
| 3,278,033 | 10/1966 | Winterstein | 210/231 |
| 3,333,702 | 8/1967 | Muller | 210/230 |
| 3,499,532 | 3/1970 | Schneider | 210/229 |
| 3,561,600 | 2/1971 | Kulita | 210/230 |

FOREIGN PATENTS OR APPLICATIONS

| | | | |
|---|---|---|---|
| 1,201,306 | 3/1960 | Germany | 210/231 |
| 1,148,976 | 5/1963 | Germany | 210/231 |

*Primary Examiner*—Theodore A. Granger
*Attorney, Agent, or Firm*—Owen, Wickersham & Erickson

[57] ABSTRACT

A filtering apparatus comprises a plurality of plate and frame sections arranged adjacent each other in alternating sequence with a layer of filter media retained between each pair. Both plate and frame sections have peripheral conduits with openings which provide access to the inner space formed within the conduits, and means on each plate section serve to collect the filtered liquid and provide for its passage into its inner space where it accumulates before passing into its peripheral conduit and out through an outlet conduit.

7 Claims, 14 Drawing Figures

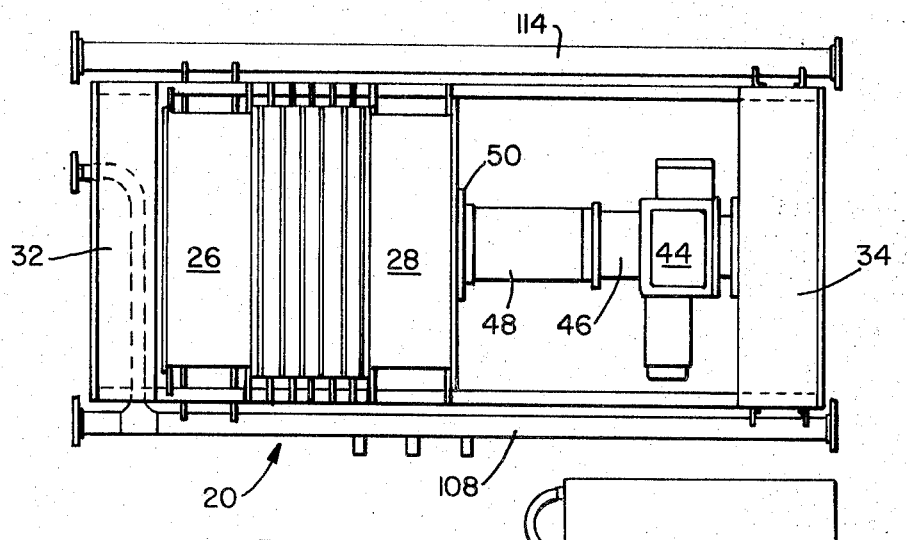
FIG_3
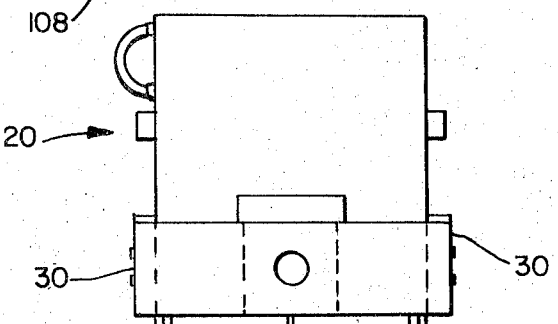
FIG_2
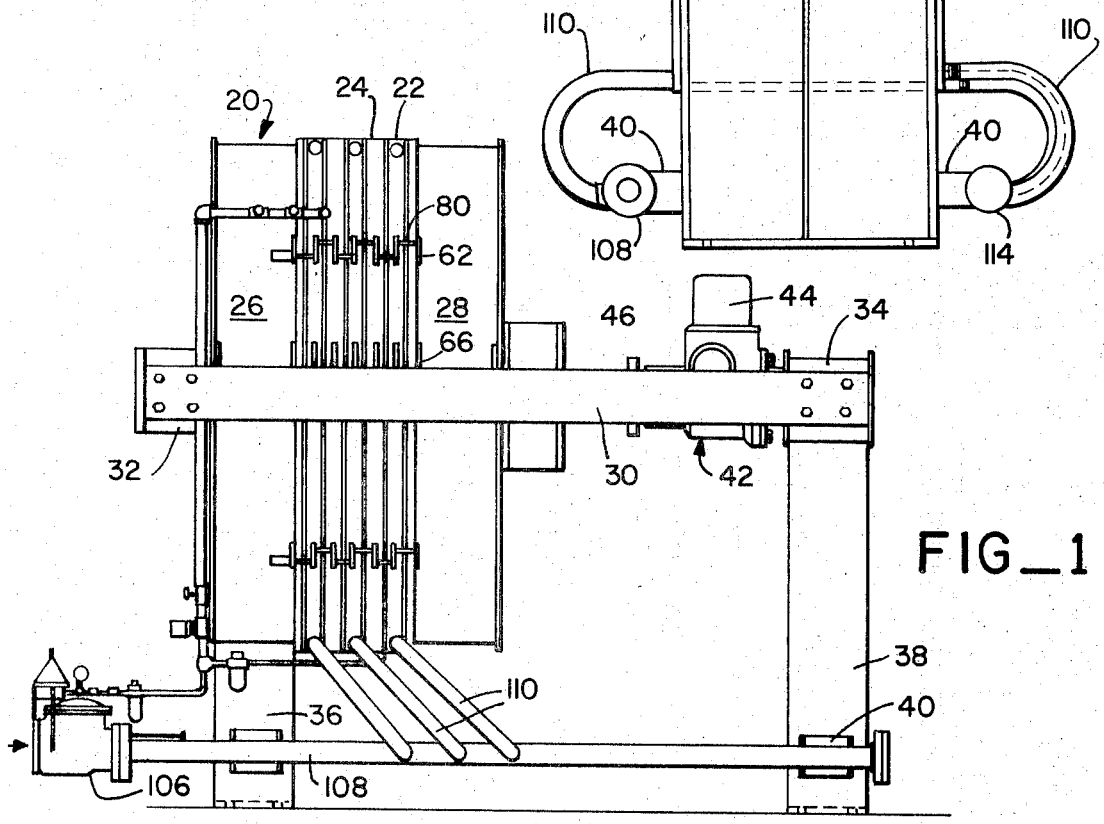
FIG_1

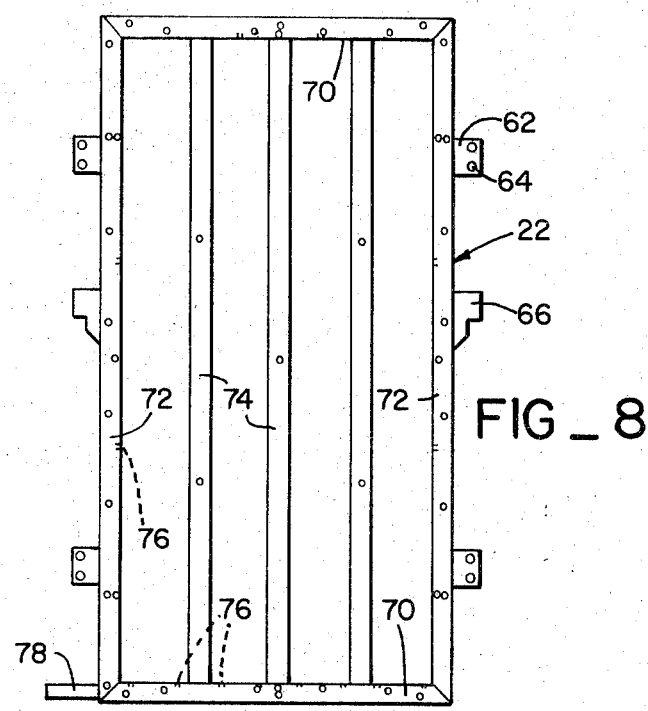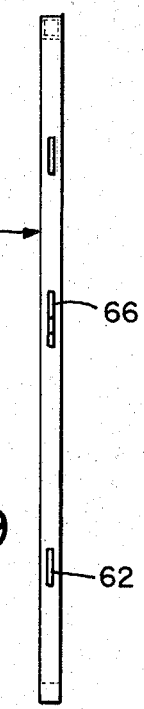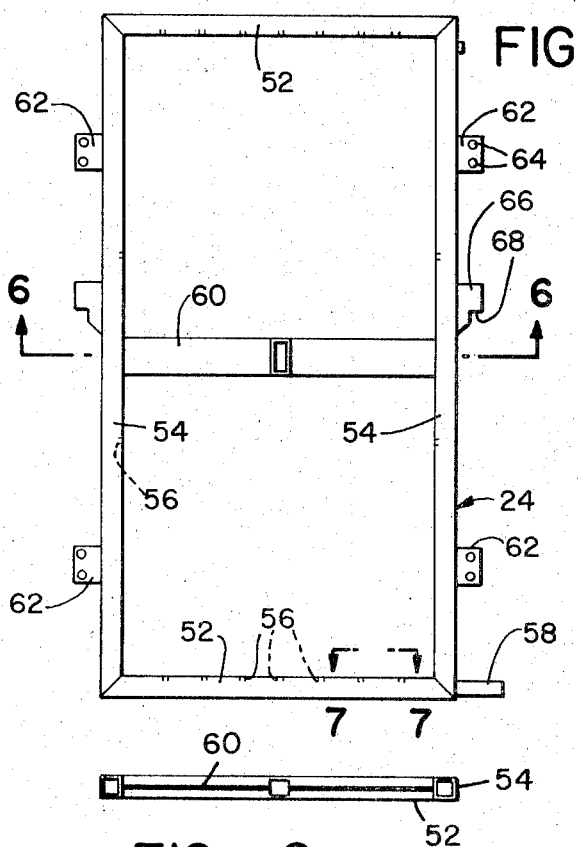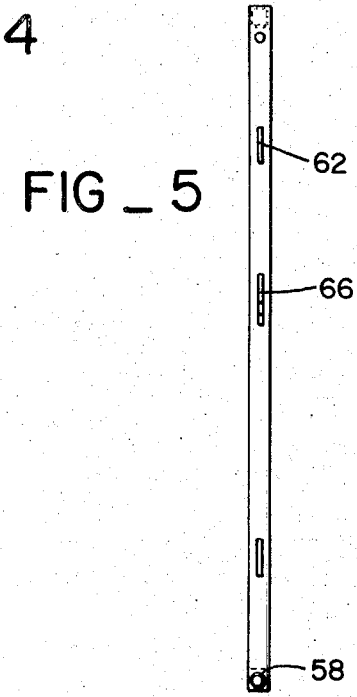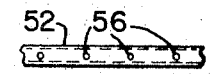

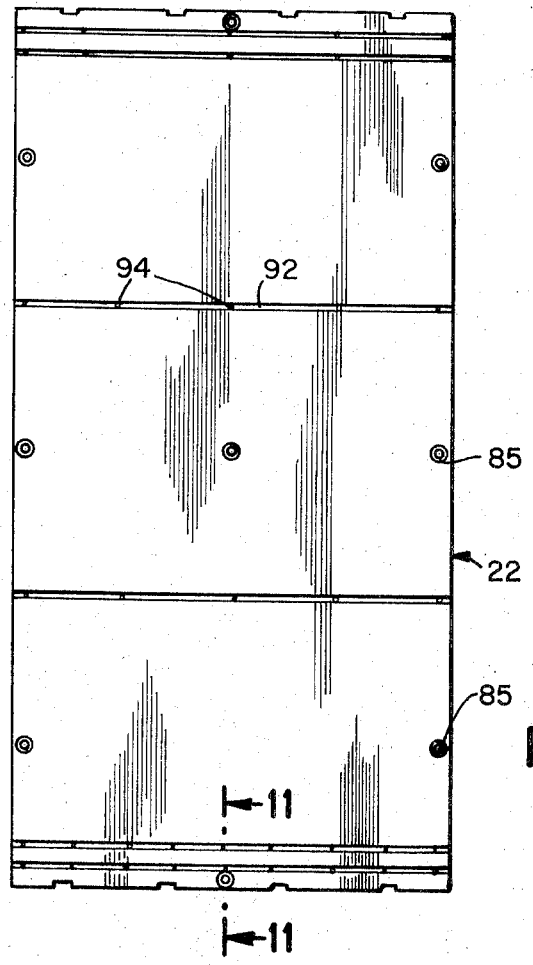
FIG_10
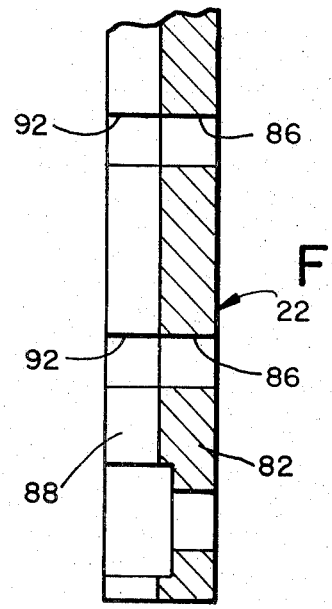
FIG_11
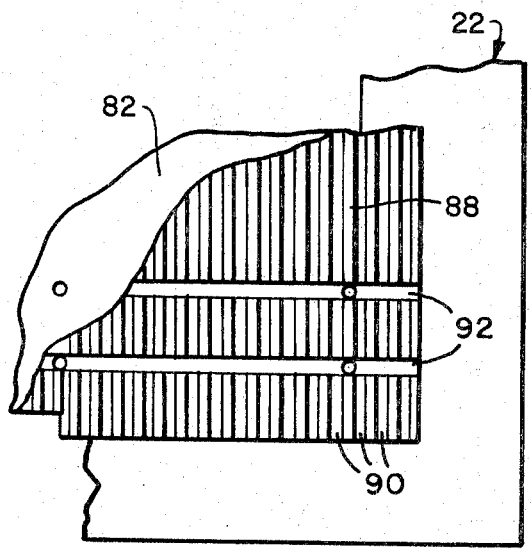
FIG_12
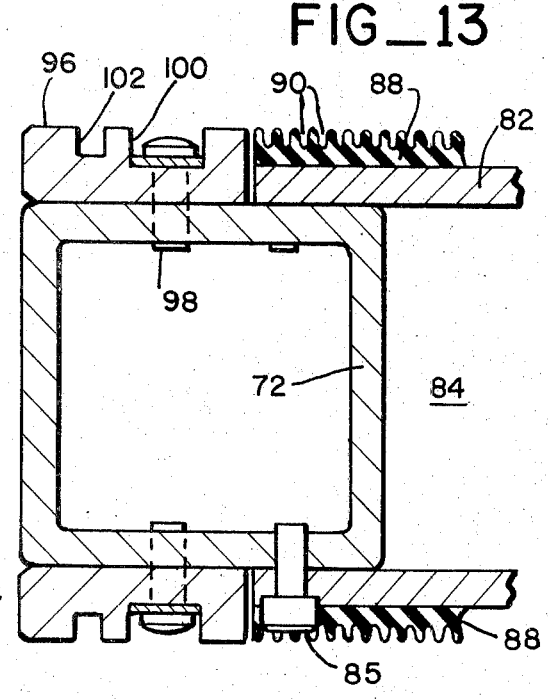
FIG_13

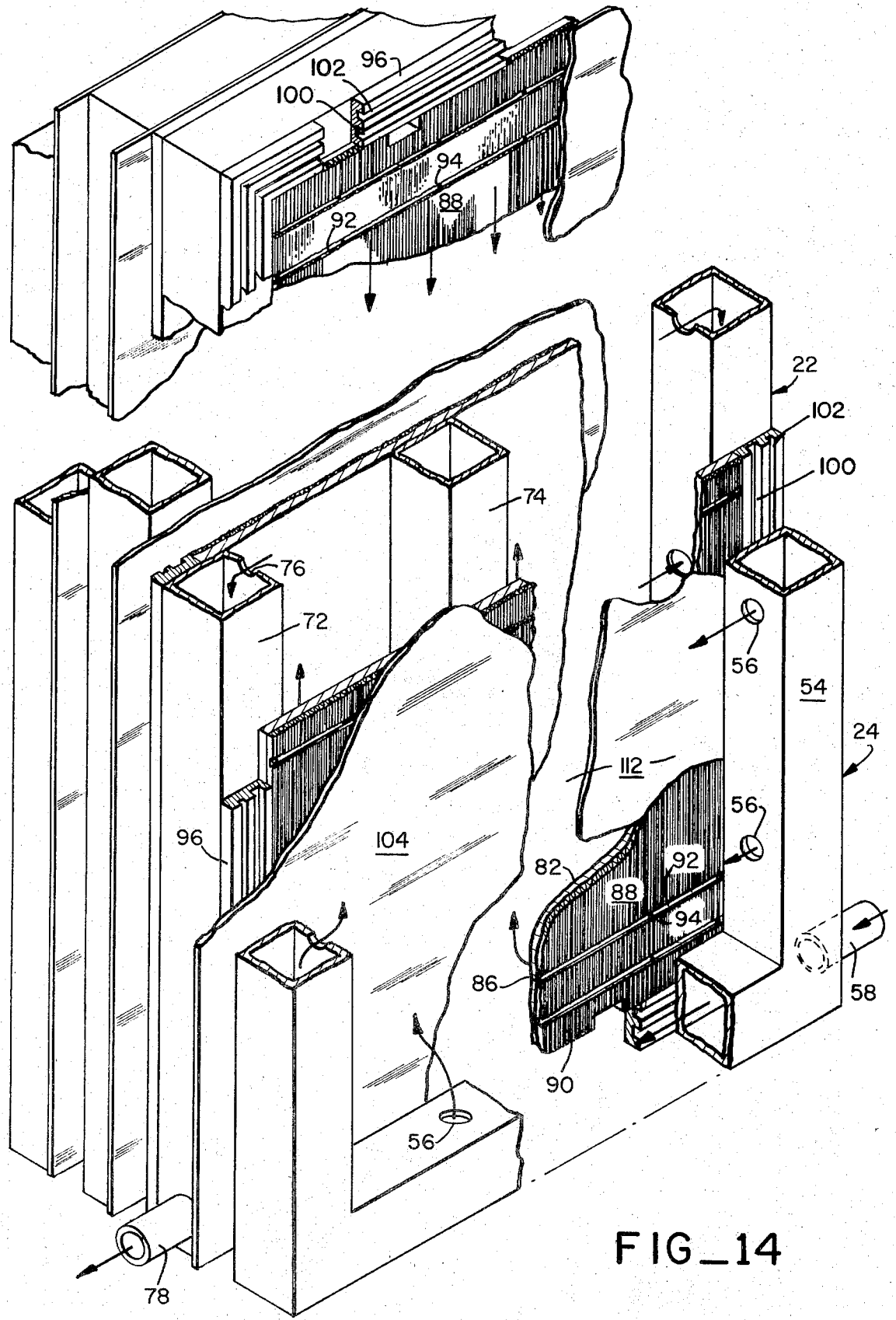
FIG_14

PLATE AND FRAME TYPE FILTERING APPARATUS

BACKGROUND OF THE INVENTION

This invention relates to liquid filtering apparatus, and more particularly it relates to an improved high capacity fine filtering apparatus.

In the field of filtration, so-called plate and frame filters have long been used for applications where large volumes of fluid must be accommodated. Essentially, the plate and frame sections are arranged in an alternating order with some form of filter media retained between them. The fluid to be filtered is then introduced in a parallel distribution to areas on one side of the filter media. When the fluid is forced through the media to areas on the other side of the media it is directed through outlets also connected in parallel to a conduit. Heretofore, both the plate and frame sections for such filtration apparatus were constructed as machined metal castings. These sections were relatively heavy, intricate in shape and design and consequently expensive to produce. Moreover, this construction resulted in a filter apparatus which was usually quite heavy, making it difficult to install and requiring considerable power to open and close the plate and frame section.

Another disadvantage of the aforesaid prior art plate and frame sections was that when assembled in their operating position the inflow of fluid to be filtered was at one point in the receiving chamber on one side of each frame section. This often caused an inflow turbulence that disturbed and adversely affected the filter media, thereby reducing filtering efficiency.

SUMMARY OF THE INVENTION

In accordance with the present invention, a filtering apparatus is provided comprising a series of plate and frame sections having a novel construction and mounted together in a parallel, alternating arrangement. These sections are supported on a suitable base structure and connected to a controllable mechanism which can separate the members to facilitate the installation and removal of filter media and then compress and hold the sections together as the filtering process takes place. Each plate and frame section is comprised of a hollow, continuous member forming a peripheral cavity and provided with an external access fitting. On the inner edge of this hollow member are a series of internal openings through which fluid can pass. Thus, when liquid to be filtered is supplied to the frame sections it fills the peripheral, hollow members and is then forced through the series of internal openings in relatively small streams into the space surrounded by the peripheral member. Each plate section is comprised of a similar peripheral hollow member with an external outlet fitting and inner openings similar to those of the frame sections. To the opposite sides of the plate sections are fixed a pair of rigid metal plates that can withstand considerable internal pressure without substantial bending. Covering these rigid plates on the side thereof adjacent a frame section is a mat or pad-like member which may be made of rubber, plastic or metal and has a plurality of parallel grooves which extend vertically from end to end. Extending transversely to these grooves from side to side are a number of parallel saw-cuts in the mat member which have spaced apart openings that extend through the mat member and are aligned with similar openings in the adjacent plate section. Thus, with a layer of filter media installed over the mat member a fluid path is provided into the space within the peripheral member of each frame section, through the filter media and onto the mat member. The filtered fluid flows by gravity down the grooves of the mat member and through the openings in the saw-cuts and the plate member into the central space of a plate section. From here it flows into the peripheral member of the plate section and into the outlet conduit.

Accordingly, it is a general object of the present invention to provide an improved filtering apparatus that overcomes the aforesaid problems and disadvantages and provides both a high capacity with a fine filtering capability.

Another object of the present invention is to provide an improved filtering apparatus of the so-called plate and frame type that is particularly well adapted for ease and economy of construction.

Another object of the present invention is to provide an improved filtering apparatus that does not require any intricate, heavy and expensive castings for the plate and frame sections.

Another object of the present invention is to provide an improved filtering apparatus wherein each plate and frame section comprises a hollow, peripheral cavity with an externally accessible opening, so that series of such sections can be readily connected in parallel to fluid input and outflow conduits.

Another object of the present invention is to provide a filtering apparatus of the plate and frame type wherein liquid to be filtered is supplied to a peripheral cavity of each frame member and then to the area adjacent the filter media with little or no turbulence, thereby avoiding any appreciable disturbance of the media and increasing filtering efficiency.

Yet another object of the present invention is to provide a filtering apparatus of the plate and frame type that is easy to clean, maintain and change filter media without the need for special tools and highly skilled labor.

Other objects, advantages and features of my invention will become apparent from the following detailed description of one embodiment that is presented with the accompanying drawing:

BRIEF DESCRIPTION OF THE DRAWING

FIG. 1 is a view in side elevation of a filter embodying the principles of the present invention;

FIG. 2 is a view in end elevation of the filter of FIG. 1;

FIG. 3 is a top view of the filter of FIG. 1;

FIG. 4 is a view in front elevation of a frame section for the filter of FIG. 1;

FIG. 5 is a view in side elevation of the frame section of FIG. 4;

FIG. 6 is a view in section taken along line 7—7 of FIG. 4;

FIG. 7 is a view in section taken along line 8—8 of FIG. 4;

FIG. 8 is a front view in elevation showing the peripheral cavity portion of a plate section for the filter apparatus of FIG. 1;

FIG. 9 is a side view in elevation of the plate section of FIG. 8;

FIG. 10 is a front view in elevation showing the media support member of a plate section for the filter of FIG. 1;

FIG. 11 is an enlarged fragmentary view in section taken along line 11—11 of FIG. 10;

FIG. 12 is an enlarged fragmentary view of one corner of a plate section for a filter according to the present invention;

FIG. 13 is a greatly enlarged fragmentary view in section showing one corner of a plate section; and FIG. 14 is a fragmentary view in perspective showing the liquid path through adjacent plate and frame filter sections according to the present invention.

With reference to the drawing, FIGS. 1 – 3 show a plate and frame filter 20 embodying the principles of the present invention and particularly adaptable for removing particulate matter and other deleterious material from liquids in various industrial and manufacturing operations. In general, it comprises a number of plate and frame sections 22 and 24 which in the embodiment shown, are mounted in an upright position in an alternating order between fixed and movable platens 26 and 28 which serve to hold them tightly together when the filter is in operation and to separate them a predetermined amount when the filter is to be cleaned and new filter media supplied. The plate and frame sections are supported on a pair of spaced apart, horizontal frame members 30, which are connected at opposite ends by a pair of cross members 32 and 34. Fixed to the cross member 32 at one end of the filter is one platen 26 which is also supported on its lower side by a short upright support member 36 that extends upwardly from the floor. At the other end of the filter are a pair of vertical frame members 38 that are fastened to the cross member 34 at their upper ends and to another cross member 40 at their lower ends. Mounted at the center of the cross member 34 is a jacking mechanism 42 which controls the horizontal positioning of the movable platen 28 and thus the separation and closing of the plate and frame sections 22 and 24. Any suitable jacking mechanism may be used which produces the desired linear movement. A convenient arrangement, as shown in FIGS. 1 and 2, comprises a motor 44 connected to a gear drive 46 whose output drives a linearly movable jack screw 48. The latter is connected by means of a plate 50 to the movable platen 28.

The fixed and movable platens are each connected to one plate section 22, which is connected to a frame member 14 so that all of the plate and frame sections are connected together in an alternating stacked arrangement.

The construction of both the plate and frame sections represents a significant departure from the prior art that provides new and advantageous results. In general, both plate and frame sections have peripheral members that are hollow, thereby providing a distribution of fluid that increases filtering efficiency. Within each peripheral member a space is formed that collects fluid before it is filtered in each frame section and collects filtered fluid within each plate section.

As shown in the embodiment of FIGS. 4 and 5, each frame section 24 is comprised of a series of top and bottom end portions 52 and side portions 54, all formed of metal tubing that are connected together at their ends, as by welding, to form a continuous conduit or peripheral member. The metal tubing used for this peripheral conduit preferably has a square or rectangular cross section and is formed from some strong, durable material, such as steel. On the inner surface of these connected tubing or conduit sections are a series of spaced apart holes 56 and fixed at one lower corner is horizontally extending inlet fitting or nipple 58. A horizontal cross bracing member 60 is connected to the side sections 54 to provide internal strength. Fixed to and extending outwardly from opposite side sections of each frame member are upper and lower pairs of connecting lugs 62, each with a pair of holes 64. Located between each upper and lower pair of such lugs is another outwardly extending guide member 66 having a notched out shoulder 68. These guide members on opposite sides of the frame member rest on the horizontal frame support members 30 and thereby support it in the upright position.

Each plate section 22 of my filter 20 is also comprised of upper and lower end portions 70 connected at their ends to parallel, spaced apart side portions 72 to form a peripheral conduit. All such conduit portions are tubular with preferably a square or rectangular cross section as with the frame sections 24. As shown in FIG. 6 the end portions 70 are interconnected by a series of spaced apart tubing members 74 which are parallel to the side portions 72 and provide internal strengthening. On the inner surfaces of the top, bottom and side sections are a series of spaced apart openings 76 that provide access to the peripheral conduit of the plate section. Each plate section 22 is also provided with outwardly extending pairs of connecting lugs 62 and guide members 66 all having the same shape, size and location of those similar members on each frame section. An outlet fitting or nipple 78 is provided at one end of the bottom end section of each plate section. When the plate and frame sections are arranged in alternating order on the filter support structure, the guide members rest with their shoulders 68 on the support members 30 and the sections are connected by bolts 80 that extend through the holes 64 of the lugs 62. The bolts are long enough to permit a predetermined amount of separation between plate and frame sections when the jacking mechanism is actuated to separate the platens.

Now, fixed to the opposite sides of the connected tubular portions of each plate section 22 are a pair of media support plates 82 which thereby form a chamber 84 between them. These support plates are preferably made of a strong rigid material and with sufficient thickness to provide minimum deflections due to fluid pressure. The overall dimensions of each plate 82 are such that their edges overlap an inner edge portion of each end and side portion forming the peripheral conduit so that they can be secured thereto by suitable fasteners, such as machine screws 85, as shown in FIG. 12. These support plates are similarly fastened to the internal support members 74. On the outer surface of each support plate are a series of holes 86 that are spaced apart and aligned horizontally along lines at different levels. Covering the outer surface of each of the support plates 82 in the embodiment is a grooved mat or pad-like member 88 comprised of a sheet of material having a large number of small, parallel grooves 90 that extend longitudinally from the top end section of the plate member to its bottom end section. As shown in detail in FIG. 13 this sheet is preferably made of a rubber like or plastic material although it could also be metallic. The grooves 90 have a uniform undulating pattern that form a series of vertical, parallel fluid passages. Extending transversely across each pad-like member 88 are a series of horizontal grooves 92 that are spaced apart vertically and run perpendicular to the longitudinal grooves 90. Along these grooves 92 are a series of openings 94 that coincide with the holes 86 in the adjacent support plate 82. Thus, fluid passing through the filter media can flow down the grooves 90 into the grooves 92 and through the openings 94 and 86 into the chamber 84. In some instances it may be desirable to combine the pad-like member 88 and its rigid support plate 82 as a single member. For example, the support plate itself may have longitudinal grooves and openings into the chamber 84 or the plate may merely be perforated with a multiplicity of openings.

Attached to opposite sides of the end and side portions 70 and 72 of each plate section around the support plates 82 are sealing strip members 96. These strips are preferably secured in place by spaced apart metal screws 98 whose heads, as shown in FIG. 13, are recessed in an inner groove 100. An outer groove 102 in the sealing strip extends completely around each plate section and thus provides a continuous sealing air passage between adjacent plate and frame sections. Air pressure supplied to these air passages assures that no fluid will leak out between plate and frame sections during the filtering operation.

The operation of the filtering apparatus 20 according to the present invention can be well understood by reference to FIGS. 1 – 3 and also to FIG. 14. With the plate and frame sections extended apart, sheets of filter media 104 are placed between them so that each such sheet is extended across and is adjacent to a groove pad-like member 88. When filtering of a fluid is to commence, the plate and frame sections are moved together in an accordian-like manner by actuation of the motor 44 which turns the jack screw 48 and moves the movable platen 28 toward the fixed platen 26. When the plate and frame sections are pressed tightly together the continuous strip members 96 form a fluid tight seal between each pair of adjacent sections. Now, the liquid to be filtered is admitted through a valve 106 in a conduit 108 having a series of flexible hoses 110 connected in parallel to a series of inlet fittings 58 for the frame sections 28 of the filter. In FIG. 14, the path of the liquid as it flows through one set of plate and frame sections is shown. As the liquid enters the inlet fitting 58 it commences to fill the peripheral cavity of the frame section 22 formed by its tubular members 52 and 54. As this cavity fills, the liquid flows through the openings 56 into the space 112 formed within the tubular members and between layers of filter media 104.

The pressure of the incoming liquid forces it through the sheet media which filters out any suspended particles or deleterious material. Clean liquid thus passes through the filter media and into the grooves 90 of the mat-like member 88. It then flows by gravity down these grooves until it reaches a transverse groove 92. At this point the filtered liquid flows horizontally until it reaches the aligned openings 94 and 86 in the member 88 and the support plate 82 respectively, thus, flowing through these openings into the space surrounded by the tubular members 70 and 72 of the plate section 26. As the space is filled up, the clean filtered liquid flows through the openings 76 in the inner wall of the tubular members, thereby partially filling them until the liquid flows out of the outlet fitting 78 of the plate section into an outlet conduit 114.

Thus, it is seen that the filtering apparatus provides a relatively large amount of filtering area with an efficient flow path for the liquid through the media. The apparatus can readily utilize various types of media for filtering a wide variety of liquids and the media can be quickly removed and replaced when required. Since the incoming liquid is initially supplied to the peripheral cavity in the plate member and then forced through a large number of the openings which are small, the incoming flow of liquid into the chamber adjacent the filter media is not concentrated in a large stream and consequently cannot disturb the filter media or any collected dirt on it. This is an important factor that increases filtering efficiency in the filter apparatus 20 and allows operation at relatively high liquid pressure levels and flow rates.

The construction of the plate and frame sections as described can be accomplished using conventional metal fabrication techniques. Thus, the use of peripheral cavities for these sections, while unique in structure and function, also provide an overall cost advantage over the heavy, complicated cast sections heretofore used in plate and frame filters.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A liquid filtering apparatus comprising:

a plurality of plate and frame sections arranged in an alternating sequence;

means for supporting said sections in a generally upright vertical position;

linking means for connecting said sections together while allowing them to be separated a predetermined amount to facilitate the insertion of filter media between adjacent plate and frame sections;

controllable actuator means for pressing said sections together when filtering is being accomplished and for separating the sections when filter media is being changed;

an inlet conduit for supplying liquid to be filtered and means for connecting it in parallel to said frame sections;

an outlet conduit for removing filtered liquid connected in parallel to said plate sections;

all of said plate and said frame sections having hollow peripheral cavities surrounding a central space with openings spaced along the inner surfaces of said cavities communicating with the surrounded space; and base means on each plate section for supporting a layer of filter media, said hollow peripheral cavities of said plate and frame sections being formed by hollow tubular structure having a generally rectangular cross-section and connected together at their ends in a rectangular frame-like configuration, said inlet conduit communicating with a fluid conduit defined by the interior of said frame section hollow tubular structure and surrounding the central space defined by said frame, said outlet conduit communicating with a fluid conduit defined by the interior of said plate section hollow tubular structure and surrounding the central space defined by said plate section hollow tubular structure.

2. The liquid filtering apparatus of claim 1 and including pad-like means fixed to each base means having outer, longitudinal grooves to collect filtered liquid passing through the media and communicating with passages through said base means into the central space of each said plate section.

3. The liquid filtering apparatus of claim 2 wherein said base means for supporting a layer of filter media comprises a pair of rigid base plates fixed to opposite sides of each said plate section to form said central space between said plate sections.

4. The liquid filtering apparatus of claim 3 wherein said pad-like means is fixed to each said base plate and comprises a mat-like member having a series of said longitudinal grooves and adapted to support said layer of filter media, each said mat-like member having on the same surface as said longitudinal grooves a series of transverse grooves for collecting liquid that passes through the adjacent filter media and spaced apart openings in said transverse grooves aligned with openings provided in said adjacent base plate, which comprises the passages through said base means, for enabling collected liquid to pass into said central space in each plate section.

5. The liquid filtering apparatus of claim 4 wherein each said mat-like member is made of a molded rubber-like material having an undulating outer surface forming said longitudinal grooves.

6. The liquid filtering apparatus of claim 2 including a sealing strip fixed to side walls of the tubular structure of each said plate section and surrounding said base means and its fixed pad-like means.

7. The liquid filtering apparatus of claim 6 wherein said sealing strips have inner and outer grooves that are parallel and aligned with the long axis of the tubular structure to which they are attached, said inner groove providing a means for recessing the heads of mounting screws and said outer groove providing a passage for air used to maintain a peripheral seal between said plate and frame sections.

* * * * *